United States Patent [19]

Overbergh et al.

[11] Patent Number: 4,857,370
[45] Date of Patent: Aug. 15, 1989

[54] HEAT RECOVERABLE ARTICLE

[75] Inventors: Noel M. M. Overbergh, Bertem; Jan L. M. F. G. Vansant, Leuven, both of Belgium

[73] Assignee: Raychem Corporation, Menlo Park, Calif.

[21] Appl. No.: 94,193

[22] Filed: Sep. 4, 1987

[30] Foreign Application Priority Data

Oct. 20, 1986 [GB] United Kingdom ............... 8625126

[51] Int. Cl.⁴ ............................................. D03D 3/00
[52] U.S. Cl. .................................. 422/34.9; 428/142; 428/229; 428/182; 428/246; 428/253; 428/257; 428/252; 428/259; 428/285; 428/287; 428/343; 428/354; 428/457; 428/35.3
[58] Field of Search ................... 156/84, 86; 428/36, 428/257, 258, 259, 246, 253, 343, 354, 457, 182; 174/DIG. 8; 418/229, 292, 285, 287

[56] References Cited

U.S. PATENT DOCUMENTS 4,631,098 12/1986 Pithouse et al. ................... 428/36

FOREIGN PATENT DOCUMENTS

0116390 8/1984 European Pat. Off. .
2440296 3/1926 Fed. Rep. of Germany .
3150544.9 6/1983 Fed. Rep. of Germany .
1482918 8/1977 United Kingdom .
1604379 12/1981 United Kingdom .

Primary Examiner—James J. Bell
Attorney, Agent, or Firm—A. Stephen Zavell; Herbert G. Burkard

[57] ABSTRACT

A heat-recoverable article suitable for enclosing a telecommunications cable splice comprises a recoverable fabric cover and a strengthening layer laminated to a surface of the fabric cover.

24 Claims, 5 Drawing Sheets

HEAT RECOVERABLE ARTICLE

DESCRIPTION

This invention relates to a heat recoverable fabric article.

Heat recoverable articles which are based on fabrics are described in the following patent publications and copending applications: U.S. 3669157 (Carolina Narrow Fabric), European patent application publication Nos. 0116393 (MPO790), 0116391 (RK169), 0117026 (RK176), 0115905 (RK177), 0116392 (RK178), 0116390 (RK179), 0117025 (RK181), 0118260 (RK189), 0137648 (RK205), 0153823 (RK228), 0175554 (RK246), European patent application No. 86303767.7 (RK273), British patent application Nos. 8528966 (RK289), 8610813 (RK296), 8529800 (B118) and U.S. patent application No. 821662 (B121). The disclosure of those applications are incorporated herein by reference.

The manufacture of heat recoverable articles from fabrics containing heat recoverable fibres can have a number of advantages as compared with conventional heat-shrinkable products, including for example ease of manufacture, since no subsequent expansion step is necessary, improved mechanical properties such as tensile strength, abrasion resistance and split resistance, and the ability to introduce very high strength heat stable fibres into the articles, all of which enable heat recoverable fabrics to be employed in fields hitherto considered inappropriate for heat shrinkable products.

The heat recoverable fabrics described in the prior art have many applications, for example covering, mechanically protecting, electrically screening, and environmentally sealing objects enclosed by the fabric. For many of those applications it is particularly desirable for the fabric to provide an enclosure which is impervious to the ingress of water, moisture or other liquid. An example of such an application is where the fabric is to provide protection of junctions in elongate substrates, such as splices in cables, particularly in telecommunications cables. It is frequently necessary to protect such junctions against the environment in order than the cables or other substrates may continue to function properly. Protection generally has to be provided against moisture, corrosive chemicals as well as insect and animal damage etc. The intention when enclosing a junction such as cable splice is to make good the original cable insulation and it is generally required that the life-time of the seal provided by the new enclosure be comparable to that of the original cable insulation. The material of the enclosure must provide a highly resistant barrier for a considerable period of time.

For many applications, for example in many telecommunications distribution cables an ability to retain pressure is also important. This may be required simply as an indication of completeness of environmental sealing, or because the cables are pressurised during use. Where cables are pressurised in use, the pressurisation may be continual, or be applied temporarily, for example to test the article.

Various tests have been devised to measure the ability of an article to retain a pressure. The tests are known as "cycling tests", and typically involve cycling the article at a constant pressure between predetermined temperature limits. To pass the test the article must not leak after a predetermined number of cycles.

The ability of an article to retain pressure depends both on the porosity of the article, that its perviousness to air, and also on its ability to withstand hoop stresses generated by pressure within the sleeve. Each of these factors is now discussed.

A fabric material is inherently pervious to air because of the intertices between the fibres making up the fabric. Thus in the fabric based articles of the prior art it is known to provide the fabric with means for rendering the fabric substantially impervious when the fabric is recovered. The means for rendering the fabric substantially impervious is typically in the form of a polymeric material used in conjunction with, bonded to, or extending through the fabric. The polymeric material is typically applied as a laminate layer on one or both sides of the fabric, or as a matrix through which the fibre extends.

The ability of an article to withstand hoop stresses generated by pressure within the sleeve depends on the components making up the wall of the article. It is with regard to this factor that recoverable fabrics have been found to be particularly successful, with the fibres which make up the fabric providing a good resistance to those hoop stresses.

It has been found that by appropriate choice of the material for the fibres of the fabric, the design of fabric used, and the material of the polymeric matrix it has been possible to make fabric sleeves of small thickness which are able to resist high pressures without significant ballooning or creep. EPA 0112390 (RK179) for example describes such a recoverable fabric article having excellent pressure retention and imperviousness to air.

Heat recoverable fabric articles are also described in the prior art which are coated internally with a layer of adhesive. This is generally provided to bond the fabric to the underlying object. The adhesive is typically a heat activated adhesive, for example a hot melt adhesive, which is activated by the heat applied to recover the fabric article.

Where an internal lining of adhesive is used, the fabric and polymeric matrix used in conjunction with the fabric is advantageously chosen so that on recovery of the fabric, and activation of the adhesive, the adhesive stays on the inside of the article and does not pass through the fabric to the outside of the article. If the polymeric matrix material is weak and/or the interstices in the fabric, between the fibres of the fabric, are large, then adhesive may pass, or burst, out of the article. The appearance of adhesive on the outside of the article as a result of this is referred to in this specification as "adhesive burst-through".

We have discovered that the performance of a fabric, recoverable article can be significantly improved by laminating a strengthening layer on the heat recoverable fabric, and that this has a number of consequential advantages. In particular we have found that the presence of strenthening layer can improve (1) the ability of the article to retain pressure, (2) the ability of the article to resist adhesive burst through on recovery of the fabric (when the fabric is used in conjunction with an inner lining of adhesive, (3) the barrier to moisture vapour transmission (MVT) of the article (by appropriate choice of material for the strengthening layer) and (4) the creep performance of the article.

These improvements have a number of consequential advantages. In particular it enables fabric designs to be used which are more open in design than has hitherto been thought desirable. Where reference is made to the openess or closeness of a fabric design it refers to the density of the fibres, that is the number of fibres per inch in the fabric. For example an open weave design will have less fibres per inch in its weft and/or warp than a closer weave design.

The present invention provides a heat recoverable article which comprises:
(a) a recoverable fabric cover, and
(b) a strengthening layer laminated to a surface surface of the fabric cover.

In one particular embodiment the strengthening layer used comprises a metal foil. In this respect it is noted that the use of metal foil liners in heat recoverable non-fabric articles is known from the prior art. GB 1604379 (B034), for example, describes a heat recoverable polymeric sleeve comprising a liner of a continuous metal foil. The metal is sufficiently thin that it does not buckle and adopts a shape exhibiting peaks and troughs under the conditions of recovery. Thicknesses of 10–25 microns are stated to be preferred. However this reference does not mention heat recoverable fabrics and does not address the problems with which this specification is concerned.

Preferably the heat recoverable article is a tubular or wraparound article and the strengthening layer is laminated to the internal surface of the article.

The provision of a strengthening layer improves the ability of the article to retain pressure, since as mentioned above the ability of a fabric article to retain pressure depends inter alia on its ability to withstand hoop stresses, and the inclusion of the strengthening layer means that at least some of hoop stresses generated within the article are accommodated by the strengthening layer rather than by the fabric. This means that the fabric per se has to accommodate less of the hoop stresses. Consequently, to achieve an article having a given ability to withstand hoop stresses, a weaker fabric (that is one that is itself less able to withstand hoop stresses), can be used in an article according to the invention, than would be necessary in article of the prior art, which does not have a strengthening layer.

The ability of the fabric per se to withstand hoop stresses depends inter alia on the density of fibres in the fabric, particularly the density of fibres extending in the direction of the hoop stresses. Thus since the fabric per se has to withstand lower hoop stresses it is possible to use more open fabrics than had hitherto been possible to achieve an article having a given overall ability to withstand hoop stresses. In particular the invention enables a recoverable fabric to be made which has sufficient ability to retain pressure to pass the pressure/temperature cycling texts referred to above using fabrics which are less densely fabricated than hitherto thought desirable, for example having an optical coverage less than 90% and even less than 70%.

The ability to use open fabrics has a number of advantages. First fabrication speeds are increased, since less fibres need to be interlinked per unit area of fabric. Also design flexibility is improved since it allows fabric designs to be used which inherently have an open structure (low optical coverage), for example WIWK (weft inserted warp knitting) and leno weave. Also more open fabrics can achieve higher recovery ratios.

Preferably a fabric is used with heat recoverable fibres such as polyolefin fibres in one of the warp and weft and heat stable fibres such as glass in the other of the warp and weft. Some embodiments of the invention have less than 90, some less than 80, even less than 70 heat recoverable fibres per inch, and some embodiments have less than 12, even less than 8 heat stable fibres per inch.

As mentioned above the ability of an article to retain pressure depends also on the porosity or perviousness to air of the article. Advantageously the strengthening layer comprises a material that is itself impervious to air, to improve the imperviousness of the article. Most preferably, however, the fabric, like the fabric in the prior art, has associated therewith means for rendering it substantially impervious when recovered. Preferably the means for rendering the fabric, substantially impervious comprises a polymeric material which is adhered to at least one, preferably both surfaces of the fabric, or is a polymeric matrix through which the fabric extends. Suitable materials are described in European patent application No. 0116393 (MP0790).

Examples of suitable polymeric materials to render the fabric impervious include thermoplastic and elastomeric materials. Examples of thermoplastic materials include: ethylene/vinyl acetate copolymers, ethylene/ethylene acrylate copolymers, LLDPE, LDPE, MDPE, HDPE, polypropylene, polybutylene, polyesters, polyamides, polyetheramides, perfluoroethylene/ethylene copolymers, and polyvinylidene fluoride. The following is a list of preferred of preferred elastomeric materials: ABS block copolymers, acrylics including acrylates, methacrylates and their copolymers, high vinyl acetate copolymers with ethylene, polynorbornene, polyurethanes and silicone elastomers.

Where a polymeric material is used to render the fabric substantially impervious, the polymeric material on the outside of the fabric is preferably cross-linked to prevent it dripping or running during heat recovery, particularly during heat recovery by means of a torch. Preferably the polymeric material on the inside of the article is not cross;linked, so it can flow on recovery to provide a bond to the adjacent strengthening layer on recovery.

Preferred embodiments according to the invention comprise a recoverable fabric cover, a strengthening layer laminated to the surface of the fabric, and a layer of adhesive coating the surface of the strengthening layer facing away from the fabric. Preferably the article is tubular or wraparound and the layers from the outside to inside are fabric (with polymer matrix of laminates if present), strengthening layer, adhesive. The adhesive is preferably heat activatable, for example a hot melt adhesive, such as a polyamide or EVA. The heat activatable adhesive preferably has a viscosity in the range of 40–150 preferably 60–80 Pa.s at 160° C., and a flow temperature in the range 80°–120° C. preferably 95°–110° C. A suitable polyamide adhesive, which is disclosed in UK patent publication 2075991, contains up to 10%, preferably up to 1% of an acrylic rubber and has excellent adhesion to untreated polyethylene, and good low temperature flexibility. The activation temperature of the adhesive is preferably chosen to correspond to the single recovery temperature of the fabric, so that the single step of heating achieves both recovery and bonding. The adhesive need not extend over the entire surface of the fabric.

When a lining of adhesive is used the strengthening layer is preferably sufficiently strong at the recovery temperature of the fabric to prevent adhesive burst through. The strengthening layer is preferably also impermeable to the passage of adhesive through its thickness. This means that when the fabric recovers the adhesive stays on the inside of the article and the activated adhesive cannot pass through the strengthening layer into contact with the fabric.

In the absence of a strengthening layer adhesive burst through is worse for open fabric designs because the more open designs have larger interstices through which the adhesive may burst. In the absence of a strengthening layer, adhesive burst-through may be a problem even when the fabric is used in conjunction with a polymeric matrix material, since at the recovery temperature the polymeric material may soften and therefore have a sufficiently low viscosity to be punctured by the adhesive as it bursts through the interstices of the fabric.

The use of a strengthening layer that is strong enough to prevent adhesive burst-through, maintaining the adhesive on its inner surface, therefore enables more open fabric designs to be used than had hitherto been thought desirable, without the risk of adhesive burst-through.

Thus desirable pressure retention and adhesive burst-through resistance can be obtained using more open fabrics than has hitherto been possible.

The strengthening layer can also be chosen so that it improves the barrier to moisture vapour transmission (MVT) of the article.

In the prior art recoverable fabric articles a small amount of moisture vapour transmission (MVT) can occur through the thickness of the article even when the fabric is used in conjunction with a polymeric matrix. This is because polymeric materials are inherently slightly permeable to moisture. Also water moisture, or other liquid ingress into the article may occur through the fibres themselves. This may be the case if the fabric used is one which includes fibres which can themselves transmit water or moisture or other liquid along their length (for example glass), if the fabric construction is such that a free end of a fibre is accessible to the liquid. In these cases water may enter the interior of the tubular article, by entering first the free end of the fibre, then migrating along the length of the fibre, from which it may then pass into the interior of the article. This a particular problem if the polymeric material used in conjunction with the fabric is laminated to the outer surface only of the fabric, or even when laminated on both sides or extending as a matrix through the fabric, when the internal surface of the polymeric material (lying within the fabric) is damaged in some way allowing a pathway for liquid to pass to the interior of the sleeve.

Due to the possibility of some moisture ingress into the fabric articles of the prior art, for some applications it is usual to include silica gel packages within the articles to absorb that moisture.

According to the present invention a strengthening layer having a low (preferably substantially zero) MVT value may be used to improve the barrier to MVT of the article. Hence recoverable fabric articles having better MVT properties than has hitherto been possible can be made, and the need to include silica gel drying packed in articles may be avoided. Where MVT values are quoted in this Specification they are measured at room temperature.

The article according to the invention has surprisingly been found to have improved creep performance as compared to comparative examples without a strengthening layer. In general the amount of creep occuring for the article with the strengthening layer is approximately half that of articles without a strengthening layer.

Preferred features of the strengthening layer, and associated layers, which provide the advantages of the present invention will now be discussed.

Preferably the strengthening layer has a tensile strength of at least 10 MPa more preferably at least 13 MPa, especially at least 16 MPa at 100° C., and a tensile strength of at least 30 MPa at room temperature. The tensile strength is particularly important in improving pressure retention, in preventing adhesive burst through, and also in improving creep performance.

The flow temperature of the strengthening layer compared to the recovery temperature of the fabric, and also the viscosity of the strengthening layer at the recovery temperature are important parameters, particularly where it is desired to stop adhesive burst through. If the strengthening layer flows on recovery, or if the viscosity of the strengthening layer is too low at the recovery temperature, the strengthening layer may be punctured by the adhesive. Preferably the strengthening layer has a flow temperature which is at least 40° C., more preferably at least 60° C. higher than the recovery temperature of the fabric. Preferably the strengthening layer has a melt flow index which is substantially zero, measured at 190° C. under 2.16 Kg.

Preferably the strengthening layer comprises a material that has a low MVT value, especially for applications where it is important to have low moisture vapour transmission from the exterior to interior of the article. Preferably the strengthening layer comprises a material having an MVT value less than 1 g/m$^2$/day, more preferably less than 0.3 g/m$^2$/day.

While it is desirable that the strengthening layer is strong, and have a high tensile strength, it must also be able to accommodate the configurational change of the article on recovery of the sleeve. This is preferably achieved by making the strengthening layer so that it can corrugate longitudinally, and preferably also uniformly on shrinkage of the fabric to accommodate the configuration change of the article.

One parameter which is considered important to determine the ability of the strengthening layer to accommodate changes in the configuration of the article by forming itself into corrugations is the stiffness of the strengthening layer. The term stiffness is applicable to both homogeneous and heterogeneous materials and where several layers are present is dependent on the inherent stiffness of the separate layers as well as their respective thickness. Stiffness measurements are considered particularly relevant for the strengthening layer of the present invention since it is envisaged that multi-layer strengthening layers could be used.

Preferred stiffness values were determined for the strengthening layer of the present invention using British Standard test BS 2782 (Part 3 method 332A 1976). The stiffness of the strengthening layer measured according to this method is preferably less than 10 N/m, more preferably less than 6 N/m measured at room temperature. At 100° C. the stiffness is preferably at most 6 N/m, more preferably at most 1.5 N/m.

The strengthening layer preferably corrugates on recovery, preferably uniformly. Preferably the strengthening layer is not prescored or pretreated in any other way to enhance the corrugation. Preferably the strengthening layer is such that the recovery forces exerted on it by the recovering fabric cause it to form corrugations having a height in the range of 1.0 to 1.3 mm, preferably about 1.16 mm, and a tip to tip distance of about 1 to 2.5 mm, preferably about 1.7 mm.

According to the invention the strengthening member is laminated to the fabric. This includes the strengthening member being directly laminated to the fabric, and also the lamination being via an intermediate member. For example, where, as is preferred, a polymeric material is used in conjuction with the fabric to render it substantially impervious, and that polymeric material extends, or is laminated to the inner surface of the fabric, the strengthening layer may be bonded directly to that polymeric material, which in turn is bonded to the fabric.

Preferably the strengthening layer remains laminated to the fabric even after recovery that is no disbonding which would cause an air gap between the fabric and the strengthening layer occurs. Disbonding is disadvantageous for a number of reasons. For example, the transfer of hoop stresses from the fabric to the strengthening layer is reduced, reducing the ability of the article to retain pressure, ingress of water may occur, for example at the edges, adhesive burst through may occur for example at the edges, and where the strengthening layer corrugates on recovery, the corrugation may be inhomogeneous.

In order that the strengthening layer remains laminated to the fabric before, during and after recovery, a layer of meltable material is preferably provided between the fabric and the strengthening layer which is molten at the recovery temperature of the fabric. This enables the strengthening layer to corrugate within the meltable material during recovery, and ensures that, after recovery, the meltable material has flowed to fill the troughs in the corrugated strengthening member. Thus there is no air gap between the fabric and the strengthening layer before, during or after recovery. Preferably the meltable material has a melt flow index in the range 0.1–10, more preferably 4–7, measured at 190° C. under 2.16 Kg. The meltable material may be, for example, a copolymer. The melt flow index of the meltable material should not be so high that it can burst through the intertices of the fabric. Hence the preferred upper limit of 10.

Preferably the strengthening layer is provided on both its major surfaces with a meltable material, preferably as defined above. Thus the strengthening layer corrugates in a matrix of meltable material. The presence of the meltable material on one, or preferably both sides of the strengthening layer enhances the uniformity of the corrugation of the strengthening layer.

The meltable material between the fabric and the strengthening layer is preferably selected to form a good bond between those layers.

The meltable layer between the fabric and the strengthening layer preferably has a thickness in the range of 20–30 microns. The meltable layer on the surface of the strengthening layer facing away from the fabric preferably has a thickness in the range 20–30 microns.

Particularly if the layer of meltable material between the strengthening layer and the fabric is too thick, and the melt flow index too high, the meltable layer may burst through the fabric.

The ability of the meltable material to flow to fill the space between the corrugated strengthening member and the fabric, and preferably the provision of a meltable matrix on which the strengthening layer corrugates, is thought to be important in improving the creep characteristics of the article. In this respect it is noted that it is surprising that a corrugated member can, in fact, improve the creep resistance of the article.

The strengthening layer may comprise a single layer or two or more layers of different materials. Where two or more layers are used each of the required properties of the strengthening layer may be provided by any one of the layers of by a combination of the layers. For example where a layer having high tensile strength and low MVT value is required two layers together may be used, one having the required high tensile strength and the other having the required low MVT value. The preferred tensile strength may be achieved, for example, using a layer of mylar or biaxially stretched nylon. The preferred low MVT value may be achieved for example using a metal layer, for example aluminium. Thus a preferred strengthening layer comprises a layer of mylar or nylon bonded, on one or both sides, to a layer of metal such as aluminium. The layer(s) of metal may be provided, for example, in the form of a foil or as a very thin metal deposited layer.

Where a support layer such as mylar or nylon, and a metal foil layer are used either layer may be nearest the fabric. Preferably the mylar or nylon is nearest the fabric to achieve the strongest bond between the fabric and the strengthening layer.

The overall thickness of the strengthening layer is preferably in the range 5 to 100 microns, more preferbly in the range 7 to 35 microns. Where a metal layer or layers is used in combination with a support layer, the support layer preferably has a thickness in the range about 8–25 microns, for example about 12–15 microns. Where the metal layer is provided as a foil it preferably has a thickness about 5–15 microns, for example about 9–12 microns. Where the metal is provided as a deposited layer or layers this preferably has a thickness of about 3–500 Angstroms. Where a metal deposited layer is used, it is preferably provided on both sides of the support layer.

The construction of the fabric will now briefly be considered, although it is envisaged that any weave or knit or non-woven agglomeration of any fibres may be used. For the present purposes the term weave is to include braids, since the products are similar although the methods of production are different. Recoverability is preferably provided by weaving or knitting fibres that are already recoverable. Alternatively it may be provided by deforming a fabric woven or knitted from dimensionally stable fibres. Examples of suitable recoverable fabrics are described in European patent application No. 84300059.7 (MP0790).

Different effects, in terms of for example, final recovery ratio, strength and flexibility, will result from different types of weave or knit even if the same fibres are used. Examples of type of weave include plain, twill, broken twill, herring bone satin, sateen, leno, hop sack, sack, mat and combinations of these. The weave may be single ply, or multiple ply weaves may be used. A particular advantage of the present invention is that high performance articles can be made from fabrics of open-design, examples of such fabrics including WIWK, and leno weave.

The fibres used to produce the recoverable fabric may be monofilaments, multifilaments, spun staple yarns or tapes. Examples of polymeric materials that may be used for the recoverable fibres include polyolefins, such as polyethylene (especialy HDPE) and polypropylene, polyamides, polyesters and fluoropolymers such as FEP, ethylene perfluoro copolymer, polyvinylidine fluoride and TFE copolymers. The recovery temperature, by which we mean the temperature at which recovery will go substantially to completion, is preferably 60° C. or more, more preferably from 80°–250° C., most preferably from 120°–150° C.

A non-recoverable fibre may be used an a reinforcement or supplement to the recoverable fibres, or may constitute the major component in one or more dimensions of the fabric. The following non-recoverable materials may be regarded as illustrative: glassfibres, carbon fibres, wires or other metal fibres, polyesters, aromatic polymers such as aromatic polyamides for example Kevlar (trade name), imides and ceramics.

The article according to the invention may be made in tubular form or wraparound form. Wraparound articles are preferred since they can be installed around substrates having no free ends. This is particularly useful when a splice in a telephone cable is to be enclosed after the repair of only a few of the many conductors it contains, since if the article is tubular, the entire cable has to be severed for installation. Wraparound products are also useful where space is limited.

Where a wraparound sleeve is used an elongate flap may be provided beneath the longitudinal slit of the sleeve to from the seal. This may be provided as a separate entity or attached to on side of the sleeve. The flap preferably also includes a strengthening layer.

The techniques by which the sleeve may be held in the wrapped configuration in any suitable way. Firstly, a lap or other bond may be made between opposing edges of the sheet, optionally with a patch to prevent peel-back. In a second possibility, some means which penetrates the fabric may be used, for example stitching, stapling, riveting, or pre-inserted catches. A third method of closure involves forming the edges of the sleeve in such a way that they may be held together by some form of clamping means, such as the C-shaped channel disclosed in UK Pat. No. 1155470, or by a reuseable tool.

Preferred forms of closure for the article are described in European patent application No. 84300058.9. In a particularly preferred embodiment the fabric is folded back on itself at each longitudinal edge to accommodate rods, preferably nylon rods, running along the length of the article. The rods and overlying fabric are held together by the closure channel.

Where this type of closure is used the strengthening layer advantageously extends to the longitudinal edges of the article and the channel grips the strengthening layer with the fabric. This substantially prevents the strengthening layer pulling out from the longitudinal edges of the article at the closure. Also, the strengthening layer substantially prevents adhesive burst through in the rod region.

For many applications it is desirable to include a liner within the sleeve. The liner preferably has a central region of larger cross-section, and end sections of small cross-section which provide transitions to the substrate. The liner typically comprises tapered fingers at the ends which provide the transitions. The liner provides support and mechanical rigidity to the article. The use of a liner with a fabric is described, for example in European patent application No. 84300057.1 (RK169). The liner typically comprises a metal such as aluminium, for example in the form of half shells.

Embodiments of the invention will now be described, by way of example, with reference to the accompanying drawings, wherein:

Figure 1:
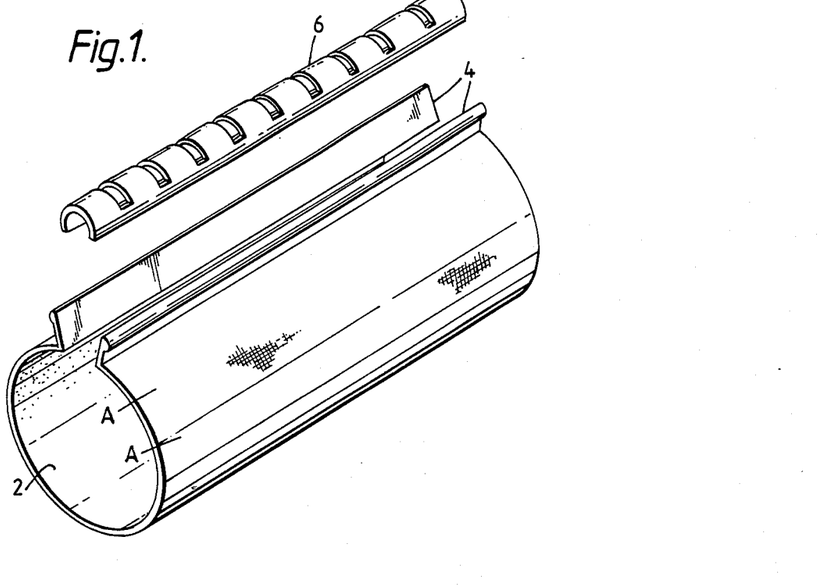
FIG. 1 is a perspective view of an article according to the invention.
Figure 2:
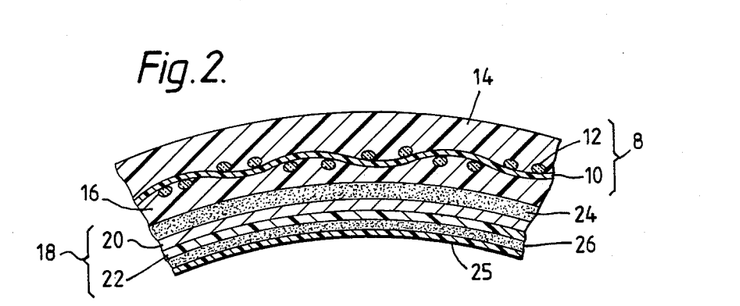
FIG. 2 is cross-section through A—A of FIG. 1.

FIG. 1 shows a wraparound article 2, according to the invention. Longitudinal edges 4 of the article are thickened and can be held together by a channel shaped closure 6. The article 2 comprises a laminate structure. This is shown in FIG. 2 which is a cross-section through A—A of the article of FIG. 1. The structure comprises a fabric 8, which is a weave comprising high density polyethylene heat recoverable fibres 10 and heat stable glass fibres 12. The recoverable fibres 10 are in the weft of the fabric and extend around the circumference of the article. The glass fibres 12 are in the warp and extend along the length of the article. The fabric recovers at a temperature of about 110°–135° C. A layer of polymeric material is laminated on both sides of the fabric. The outermost layer 14 (facing outwards of the article is cross-linked by irradiating it to a beam dose of 12 MRads. This restricts the tendency of layer 14 to flow during recovery. Inner layer 16 is uncross-linked. This is explained later. Strengthening layer 18 is laminated to the inner surface of the inner laminate layer 16. On recovery polymeric layer 16 which is not cross-linked flows and enhances bonding to the strengthening layer 18. This is why it is not cross-linked.

The strengthening layer 18 itself comprises two layers, which are respectively a layer of aluminium (20) and a support layer of mylar (22). To either side of these layers are bonded copolymer hot melt adhesive layers 24 and 26. Adhesive layers 24 bonds the strengthening layer 18 to the inner laminate layer 16 both before and after recovery. Adhesive layer 26 bonds the article to the underlying object after recovery. Adhesive layers 24 and 26 have a flow temperature of about 200° C. They also have a melt flow index of about 5 at 190° C. measured at 2.16 Kg. Thus at the recovery temperature of the fabric strenghening layer 18 buckles in layers 24 and 26, the adhesive layer 24 flowing to fill any gaps between the strengthening layer 18 and the fabric 8. A final layer of a polyamide adhesive 25 is provided on the surface of adhesive layer 26. This is to bond the article 2 to the underlying object.

Figure 3:
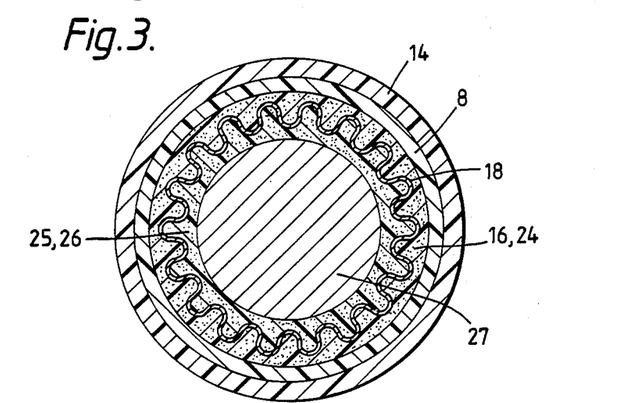
FIG. 3 is a cross-section through the article of FIGS. 1 and 2, after recovery
Figure 4:
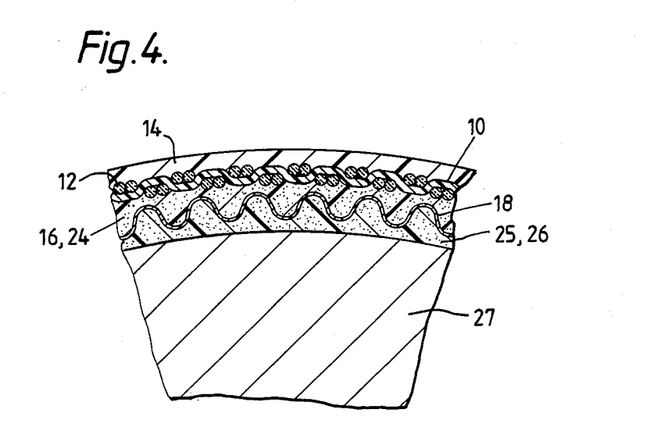
FIG. 4 is an enlarged view of part of the cross-section of FIG. 3

FIGS. 3 and 4 show the article after recovery onto an object such as a cable 27. The recoverable fibres 10 have shrunk pulling the glass fibres 12 closer together. The strengthening layer 18 has buckled or corrugated to accommodate the reduction in size of the article. Adhesive layer 24 has flowed to fill the troughs in the buckled or corrugated layer 18 so that the strengthening layer 18 remains laminated to fabric 8. Adhesive layers 26 and 25 have flowed to fill the gap between the strengthening layer 18 and cable 27

Figure 5:
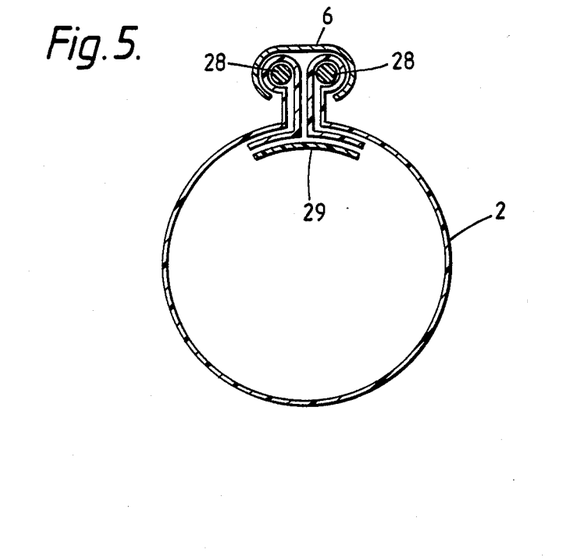
FIG. 5 is an end view of another article according to the invention.
Figure 6:
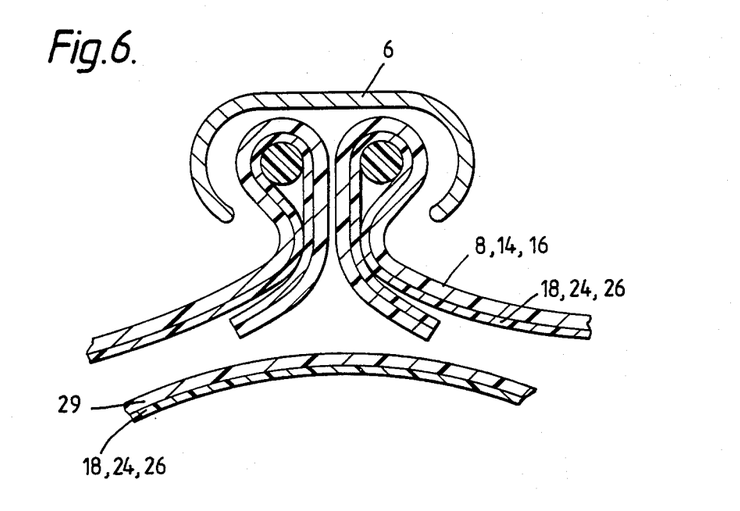
FIG. 6 is an enlarged view of the closure portion of the article of FIG. 4.

FIGS. 5 and 6 show another wraparound article according to the invention. The material of the article is the same as that described in FIGS. 1 to 3, but the material at the longitudinal edges of the article is wrapped around nylon rods 28 which extend along the length of the sleeve. The strengthening layer 18 wraps with the fabric 8. Closure channel 6 is positioned over the rods and holds the longitudinal edges in close conformity. A separate flap 29 is used to seal the gap underneath the channel 6. This may instead be secured to one side of the wrapped article. This also contains strengthening layer 18.

Figure 7:
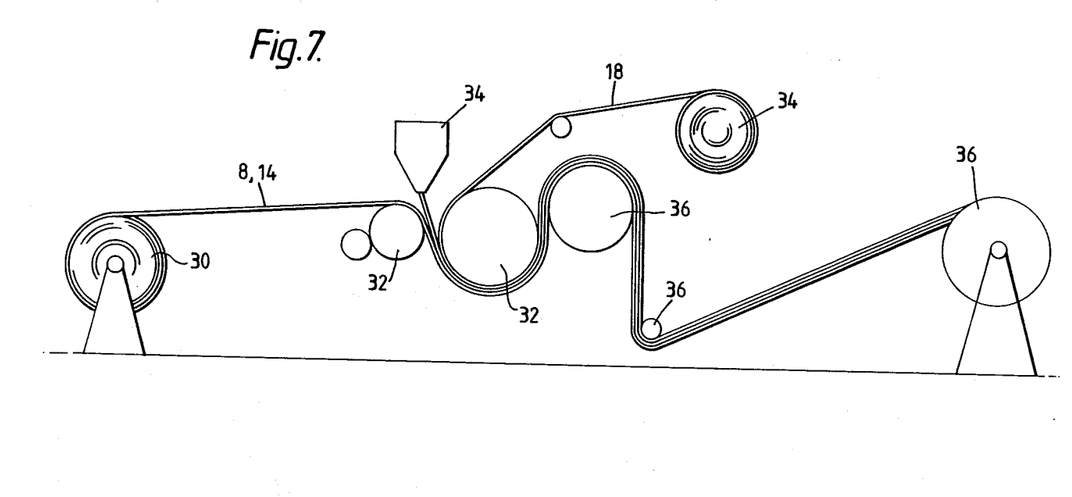
FIG. 7 is a schematic view showing part of a preferred process for making an article according to the invention.

FIG. 7 illustrates part of a preferred process for making an article according to the invention. First a recoverable fabric is made, e.g. woven, from heat recoverable and optionally other fibres. The fabric is then preferably irradiated to cross-link it, then a layer of low density polyethylene material laminated on one side. That fabric is preferably wound on rollers 30 with the single polymeric laminate layer which will form the outer layer 14 of the article on the inner surface of the roller (i.e. facing the bottom of the diagram as it is drawn from the roller). This fabric is then fed to another set of rollers 32 where a second layer of low density polyethylene is laminated on the other side of the fabric from roller 34. This forms the inner laminate layer 16. Simultaneously the strengthening layer 18 is laminated on top of the polymeric layer 16, being fed from rollers 34. The lamination process is completed by rollers 36. Longitudinal edges of the fabric may be formed into the shape shown in FIG. 3, a flap secured if desired, then the article cut to length.

EXAMPLES

Adhesive Burst Through

Figure 8:
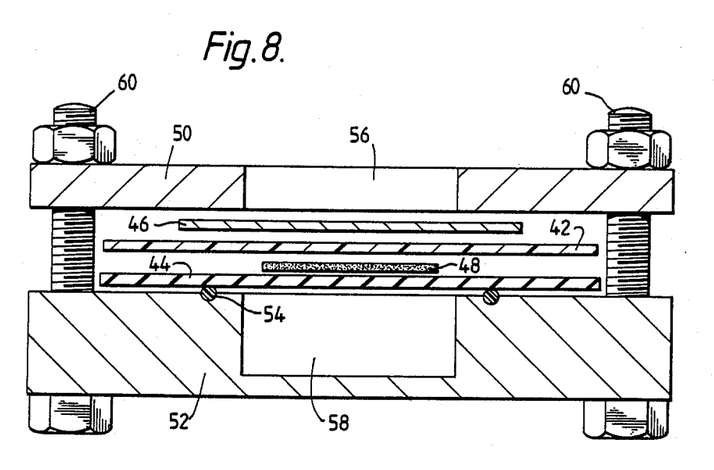
FIG. 8 is a cross-sectional view of an apparatus used to test adhesive burst through of articles according to the invention and other

Comparative tests were carried out to show the effect of a strengthening layer on adhesive burst through for a number of samples. A specific apparatus and test was devised to measure tendency of the samples to suffer adhesive burst through. The test is now explained with reference to FIG. 8, and is carried out as follows:

Test sample 42 is positioned between a silicone rubber membrane 44 of thickness 3 mm and a metallic screen 46 having a penetration factor of 55%. An adhesive sheet 48 of size 40 mm×40 mm and thickness 0.5-0.9 mm lies between the silicone rubber membrane 44 and the metallic screen 46. The above members are clamped between top and bottom aluminium plates 50 and 52 with the penetrable metal screen adjacent to the top plate. A viton O-ring 54 seals between the silicone rubber membrane 44 and the bottom plate 52. Top and bottom plates 50 and 52 contain equal sized circular apertures 56 and 58 which lie one above the other. Screws 60 connect plates 50 and 52, and these are tightened to secure members 42, 44, 46, 48 and 54 between them.

The circular aperture 56 and 58 in plates 50 and 52 are 50 mm in diameter. The top aperture 56 is exposed to the atmosphere. The bottom aperture 58 is in communication with a reservoir which can be pressurised to test the sample. Pressurisation causes the silicone rubber member 44 to press against the adhesive tending to force it through the sample 42 and the metal screen 46.

The apparatus containing the test sample is placed in an oven and heat stabilised at 150° C. for one hour. After stabilisation the pressure is increased by increments of 10 kPa until adhesive burst through is observed. This is recorded. The test is carried out at 150° C. since this is about the temperature used for recovery of typical recoverable fabrics, and hence the temperature at which adhesive burst through would occur in practice.

The test was carried out for a number of different fabric designs. Each fabric was provided with a polymeric material to render it impervious. The polymeric material was provided as a laminate of low density polyethelene on both sides of the fabric. Each layer was 0.1 to 0.5 mm thick.

Examples 2, 3, 5, 7, 9 and 11 are comparative examples which do not use a strengthening layer. Examples 1, 4, 6, 8 and 10 are articles according to the invention. Each includes a strengthening layer which is a laminate with the following construction:

biaxial stretch nylon—thickness 15 microns (nearest the fabric)
aluminium foil—thickness 12 microns (furthest from fabric)

Also a layer of hot melt adhesive copolymer thickness 35 microns is provided between the fabric and the strengthening layer, and a layer of hot melt copolymer thickness 25 microns is provided on the surface of the strengthening layer facing away from the fabric. The total copolymer/nylon/aluminium/copolymer laminate is that supplied by UCB under the trade name Sidamil.

The strengthening layer used in examples 1, 4, 6, 8 and 10 has an MFI value of substantially zero.

The results are set out in Table 1 below:

TABLE 1

| EX NO | MATERIAL CONSTRUCTION (See Key) | FABRIC DESIGN | LAMINATION | STRENGTHENING LAYER | PRESSURE TO CAUSE BURST THROUGH kPa |
| --- | --- | --- | --- | --- | --- |
| 1 | A | WIWK | one side | yes | 400 |
| 2 | A | WIWK | both sides | no | 85 |
| 3 | A | WIWK | one side | no | 50 |
| 4 | B | Twill 2 | both sides | yes | 400 |
| 5 | B | Twill 2 | both sides | no | 210 |
| 6 | B | Broken Twill | both sides | yes | 400 |
| 7 | B | Broken Twill | both sides | no | 205 |
| 8 | B | Satin 4 | both sides | yes | 400 |
| 9 | B | Satin 4 | both sides | no | 135 |
| 10 | C | Broken Twill | both sides | yes | 400 |

TABLE 1-continued

| EX NO | MATERIAL CONSTRUCTION (See Key) | FABRIC DESIGN | LAMINATION | STRENGTHENING LAYER | PRESSURE TO CAUSE BURST THROUGH kPa |
|---|---|---|---|---|---|
| 11 | C | Broken Twill | both sides | no | 220 |

Material Construction Key
A 4 bundles of 5 and 7 bundles of 4 heat recoverable high density polyethylene fibres = 63 fibres per inch in weft and 6 glass fibres per inch in warp.
B 18 bundles of 4 heat recoverable high density polyethylene fibres = 72 heat recoverable fibres per inch in weft 9 glass fibres per inch in warp.
C Fibrillated 16 insertions of 2 flat embossed fibrillated heat recoverable high densith polyethylene fibres per inch in the weft, 9 glass fibres per inch in the warp The results clearly show that adhesive burst through is reduced significantly for all fabrics types by including a strengthening layer. Much higher forces are needed to cause burst through when a strengthening layer is used.

A second test was carried out to show the effect of the melt flow index of the strengthening laye of the ability of the material to resist adhesive burst through.

In each case the fabric design was design B as above. Each fabric was provided with a polymer material to render it impervious. The polymeric material was provided as a laminate of low density polyethylene on both sides of the fabric. Each layer was 0.1 to 0.5 mm thick.

The results, as shown in Table 2 below, show that even when the strengthening layer has a very low melt flow index, of the order of 0.3, the pressure to cause adhesive burst through is significantly reduced, compared to the pressure required using the SML layer of Examples 1, 4, 6, 8 and 10 in which the strengthening layer has an MFI value of substantially zero.

For applications in which adhesive burst through is unacceptable the materials of examples 12–15 are not preferred for the strengthening layer.

TABLE 2

| EX NO | Material of Strengthening layer | Melt Flow Index | Pressure to cause adhesive burst through KPa |
|---|---|---|---|
| 12 | Elvax 670 (supplied by Dupont) | 0.28 | 125 |
| 13 | DPD 6182 (supplied by Union Carbide) | 0.26 | 130 |
| 14 | CxA 2002 (supplied by Dupont) | 6.67 | 100 |
| 15 | Plexar 100 (supplied by DSM) | 0.64 | 130 |

Creep Behaviour

A comparative test was also carried out to determine the tendency of articles with and without strengthening layer to creep. The fabric construction used in each case was that of type 'B' given above.

The following samples were used.

| EX NO | |
|---|---|
| 16 | Without a strengthening layer |
| 17 | With a strengthening layer of PET/copolymer coated on one side with 9 micron aluminium layer |
| 18 | As example 17 but with a 500. Angstrom thick aluminium layer in place of 9 micron thick layer |

Figure 9:
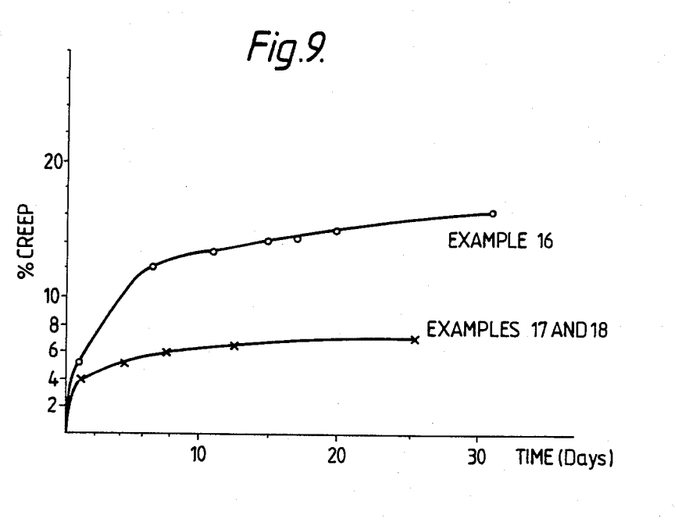
FIG. 9 is a graph showing creep behaviour of articles according to the invention and others.

The samples were recovered, causing the strengthening layer when present to or corrugate, and then subjected to creep testing at 60° C. under an internal pressure of 70 kPa for approximately one month. The results are set out in the graph (FIG. 9).

It can be seen that the addition of the strengthening layer significanntly reduces the creep of the article. For example the sample without a strengthening layer (Example 12) creeps more than 14% in 30 days, while those with strengthening layers (D+E) creep less than 7%. The performance is thus about twice as good with a strengthening layer.

It is thought surprising that the presence of the strengthening layer can improve creep performance, even though it is corrugated.

We claim:

1. A heat recoverable article which comprises:
   (a) a recoverable fabric cover; and
   (b) a strengthening layer laminated to a surface of the fabric cover said strengthening layer includes at least one layer of a material impervious to air.

2. A heat recoverable article according to claim 1, which is tubular or wraparound, wherein the strengthening layer is laminated to the internal surface of the fabric cover.

3. An article according to claim 1, in which the fabric has associated therewith means for rendering it substantially impervious when recovered.

4. An article according to claim 3, wherein the means for rendering the fabric, substantially impervious, comprises a polymeric material adhered to at least one surface of the fabric or a polymeric matrix through which the fabric extends.

5. An article according to claim 3, wherein the lamination of the strengthening layer to the fabric bonds the strengthening layer directly to the means for rendering the fabric substantially impervious.

6. An article according to claim 1, wherein the recoverable fabric is radially shrinkable, and strengthening layer corrugates longitudinally, preferably uniformly, on shrinkage of the fabric to accommodate the configuration change of the article.

7. An article according to claim 1, wherein the strengthening layer has a tensile strength of at least 10 MPa at 100° C. and/or at least 30 MPa at room temperature.

8. An article according to claim 1, wherein the strengthening layer has a stiffness measured according to BS 2782 of less than 10 N/m at room temperature.

9. An article according to claim 1, wherein the strengthening layer has a flow temperature of at least 40° C. higher than the recovery temperature of the fabric.

10. An article according to claim 1, wherein the strengthening layer has a melt flow index which is substantially zero measured at 190° C.

11. An article according to claim 1, wherein the strengthening layer comprises a material having a moisture vapour transmission value (MVT) les than 1 g/m²/day.

12. An article according to claim 1, wherein the strengthening layer comprises a laminate of a material having a tensile strength greater than 10 N/m at room temperature, preferably nylon or mylar, and a material having an MVT value less than 1 g/m²/day, preferably a metal foil.

13. An article according to claim 1, wherein the thickness of the material having the tensile strength greater than 10 N/m is in the range 10-20 microns.

14. An article according to claim 12, wherein the layer having the MVT value less than 1 g/m²/day is a metal foil layer having a thickness in the range 5-15 microns, or is a metal deposited layer having a thickness in the range 100-500 Angstroms.

15. An article according to claim 14, wherein two metal layers are provided, which are laminated one on each side of the material having the tensile strength greater than 10 N/m.

16. An article according to claim 5, or any claim dependent thereon, wherein a meltable material is provided between the strengthening layer and the fabric which flows on recovery to fill the troughs between the strengthening layer and the fabric on corrugation of the strengthening layer.

17. An article according to claim 16, wherein the meltable material has a melt flow index in the range 0.1-10, preferably in the range 4-7, measured at 190° C. under 2.16 Kg.

18. An article according to claim 1, wherein the strengthening layer remains laminated to the fabric before, during and after recovery.

19. An article according to claim 1, wherein the fabric is a weft inserted warp knitted fabric or a leno weave fabric.

20. An article according to claim 1, wherein the innermost surface of the article, which is hollow, is coated with a heat activatable adhesive.

21. An article according to claim 1 wherein the strengthening layer comprises at least one metal layer and at least one support layer.

22. The article according to claim 21 wherein the metal layer is formed as a metal deposited layer.

23. The article according to claim 21 wherein the metal layer is a discrete layer of metal.

24. The article according to claim 23 wherein at least one support layer is selected from the group consisting of mylar, nylon, or mixtures thereof.

* * * * *